US005719391A

United States Patent [19]

Kain

[11] Patent Number: 5,719,391
[45] Date of Patent: *Feb. 17, 1998

[54] FLUORESCENCE IMAGING SYSTEM EMPLOYING A MACRO SCANNING OBJECTIVE

[75] Inventor: Robert C. Kain, San Jose, Calif.

[73] Assignee: Molecular Dynamics, Inc., Sunnyvale, Calif.

[ * ] Notice: The term of this patent shall not extend beyond the expiration date of Pat. No. 5,672,880.

[21] Appl. No.: 616,772

[22] Filed: Mar. 15, 1996

Related U.S. Application Data

[63] Continuation of Ser. No. 351,603, Dec. 8, 1994, abandoned.

[51] Int. Cl.$^{6}$ .............................. G01J 3/18; G01N 21/24

[52] U.S. Cl. .............................. 250/235; 250/458.1; 356/39

[58] Field of Search .............................. 250/234–236, 250/461.1, 461.2, 458.1; 356/39, 317, 318, 326, 328, 381, 382

[56] References Cited

U.S. PATENT DOCUMENTS

| | | | |
|---|---|---|---|
| 3,657,537 | 4/1972 | Wheeless, Jr. | 356/39 |
| 4,058,732 | 11/1977 | Wieder | 250/461.1 |
| 4,284,897 | 8/1981 | Sawamura et al. | 250/461 B |
| 4,877,965 | 10/1989 | Dandliker et al. | 250/458.1 |
| 5,022,757 | 6/1991 | Modell | 356/318 |
| 5,192,980 | 3/1993 | Dixon et al. | 356/326 |
| 5,260,578 | 11/1993 | Bliton et al. | 250/461.1 |
| 5,381,224 | 1/1995 | Dixon et al. | 356/72 |
| 5,504,336 | 4/1996 | Noguchi | 250/458.1 |

OTHER PUBLICATIONS

Richard L. Shoemaker et al., "An Ultrafast Laser Scanner Microscope for Digital Imaging Analysis", *IEEE Transactions on Biomedical Engineering*, vol. BME–29, No. 2, Feb. 1982, pp. 82–91.

*Primary Examiner*—Stephone Allen
*Attorney, Agent, or Firm*—Thomas Schneck

[57] ABSTRACT

A fluorescence imaging system that includes an objective that is both achromatic and has an external entrance pupil. The objective also serves as a condenser for the system which substantially reduces the system's cost and footprint. With the objective positioned above a sample so that they are in close proximity to one another, a laser directs a collimated beam of light to a scan device located at the objective entrance pupil. The scan device reflects, refracts, or diffracts the light through the lens to illuminate a spot on the sample's surface. The scan device illuminates a line or an area on the sample surface by varying the angle of laser light, in one or two dimensions, into the objective. The sample emits fluorescent light in response to the illumination. The fluorescence light is collected by the objective and passes through the system along the path of the illumination light. A wavelength-discriminating dichroic filter is placed along the optical axis between the laser and the objective to direct the fluorescent light onto a photo-detector to produce a signal representing the sample surface emitting the fluorescent light. A display device is provided that displays the digitized data in a raster format.

39 Claims, 3 Drawing Sheets

FLUORESCENCE IMAGING SYSTEM EMPLOYING A MACRO SCANNING OBJECTIVE

This application is a continuation of application Ser. No. 08/351,603 filed on Dec. 8, 1994 now abandoned.

TECHNICAL FIELD

The present invention relates to laser scanning imaging systems, particularly for use in fluorescence imaging.

BACKGROUND ART

Fluorescence microscopy is often used in the fields of molecular biology, biochemistry and other life sciences. One such use is in identifying a specific antigen using antibodies. Antibodies are proteins produced by vertebrates as a defense against infection. They are made of millions of different forms, each has a different binding site and specifically recognizes the antigen that induces its production. To identify an antigen, a sample of cells is provided that contains specific antibodies coupled to a fluorescent dye. The cells are then assessed for their fluorescence. Taking advantage of the precise antigen specificity of antibodies, the cells having fluorescent properties are known to contain a specific antigen.

Originally, the fluorescence of cells was assessed manually by visual inspection, using conventional microscopy. This proved time-consuming and costly. The need for high-speed automated systems became manifest. Many high-speed imaging systems, such as confocal microscopes, are available for assaying cell samples. The illumination and collection optics, along with their relative geometry, determine in large part the parameters of the other system elements.

A prior art high-speed imaging system is shown in FIG. 1 and includes an F-theta objective 10 positioned above a sample 11 so that the surfaces of the objective are perpendicular to the sample's normal. A laser light source 12 produces a beam 13. The objective 10 directs the beam 13 to illuminate a spot on the sample's surface. An oscillating reflective surface 14 is disposed at the pupil 15 of the system, between the light source 12 and the objective 10, to deflect the beam 13 back and forth along one axis. The sample is placed on a table to move the sample in a direction perpendicular to the first scan direction, thereby resulting in a two dimensional scan pattern on the sample's surface. The objective is not designed for coaxial collection resulting in light reflected from the sample surface being collected by a condenser assembly 16 that is separate and apart from the objective. Such a geometry results in increased system footprint, increased optical complexity, and a limitation of solid angle collection. The collected light is then imaged on a photo-detector 17. The design of a classical F-theta lens is primarily for monochromatic illumination. As a result, such lenses lack good polychromatic performance. Therefore, the objective 10 manifests lateral and axial chromatic aberrations over a broad band of wavelengths.

A prior art high-speed imaging system, similar to that described with respect to FIG. 1, is disclosed by Richard L. Shoemaker et al., "An Ultrafast Laser Scanner Microscope for Digital Imaging Analysis", IEEE *Transactions on Biomedical Engineering*, Vol. BME-29, No. 2, February 1982, pp. 82–91. The principal difference between these two systems concerns the scanning device. Instead of a galvanometric scanner, Shoemaker et al. require the use of a rotating polygon mirror to scan the spot over the sample's surface.

Another prior art high-speed imaging system is disclosed in U.S. Pat. No. 4,284,897 to Sawamura et al. in which laser light is reflected through two galvanometric mirrors and one dichroic mirror to direct a beam through an objective and illuminate a spot on a sample's surface. The galvanometric mirrors are swung in appropriate directions to allow the spot to scan over the entire surface of the sample. In response to the illuminating spot, the sample emits fluorescence light. The objective, serving as a condenser lens, transmits the light back through a first dichroic mirror. Positioned behind the first dichroic mirror is a second dichroic mirror that splits the fluorescent light into a light produced by a cytoplasm and light produced by a nucleus. The cytoplasm fluorescence and the nucleus fluorescence is transmitted to a respective photo-detector.

A disadvantage of the prior art systems is that in addition to the illumination optics, additional optics are required either to scan the beam on a sample or to collect light emitted from a macro size sample, thereby increasing the systems' cost and size.

It is an object, therefore, of the present invention to provide a high-speed, low cost, laser scanning system that will provide point by point fluorescent imaging of a sample on a macro scale.

It is a further object of the present invention to provide an fluorescence imaging system of a substantially smaller size than the prior art systems that affords a larger scan field than existing coaxial illumination and collection systems.

DISCLOSURE OF THE INVENTION

These objectives have been achieved by positioning a telecentric lens, that has an external pupil and is achromatic, above a sample so that they are both in close proximity with one another. The lens forms the objective of the system. The objective is defined as the system's lens that is closest to the sample and which has as its front focus, the sample. A laser produces a collimated beam of coherent light that is directed through the objective to illuminate a spot on the sample's surface, thereby stimulating a small region of the sample to emit fluorescent light. The spot usually has a diameter close to the limit defined by the laws of diffraction. The objective also serves as a condenser and collects the fluorescent light emitted by the sample. The objective directs the collected light back along the identical path traveled by the incident beam, but in the opposite direction. A wavelength-discriminating dichroic filter is placed along the optical axis between the laser and the objective to separate the fluorescent light from the incident beam and direct the fluorescent light onto a photo-detector to produce a signal representing the sample surface emitting the fluorescent light. To obtain a full field view of the sample, a two dimensional scanning device, with a reflecting element having a scan center positioned at the pupil of the system, scans the spot over the entire surface of the sample. A display device is provided and synchronized with the scanning device to reproduce an image of the sample.

BEST MODE FOR CARRYING OUT THE INVENTION

Figure 2:
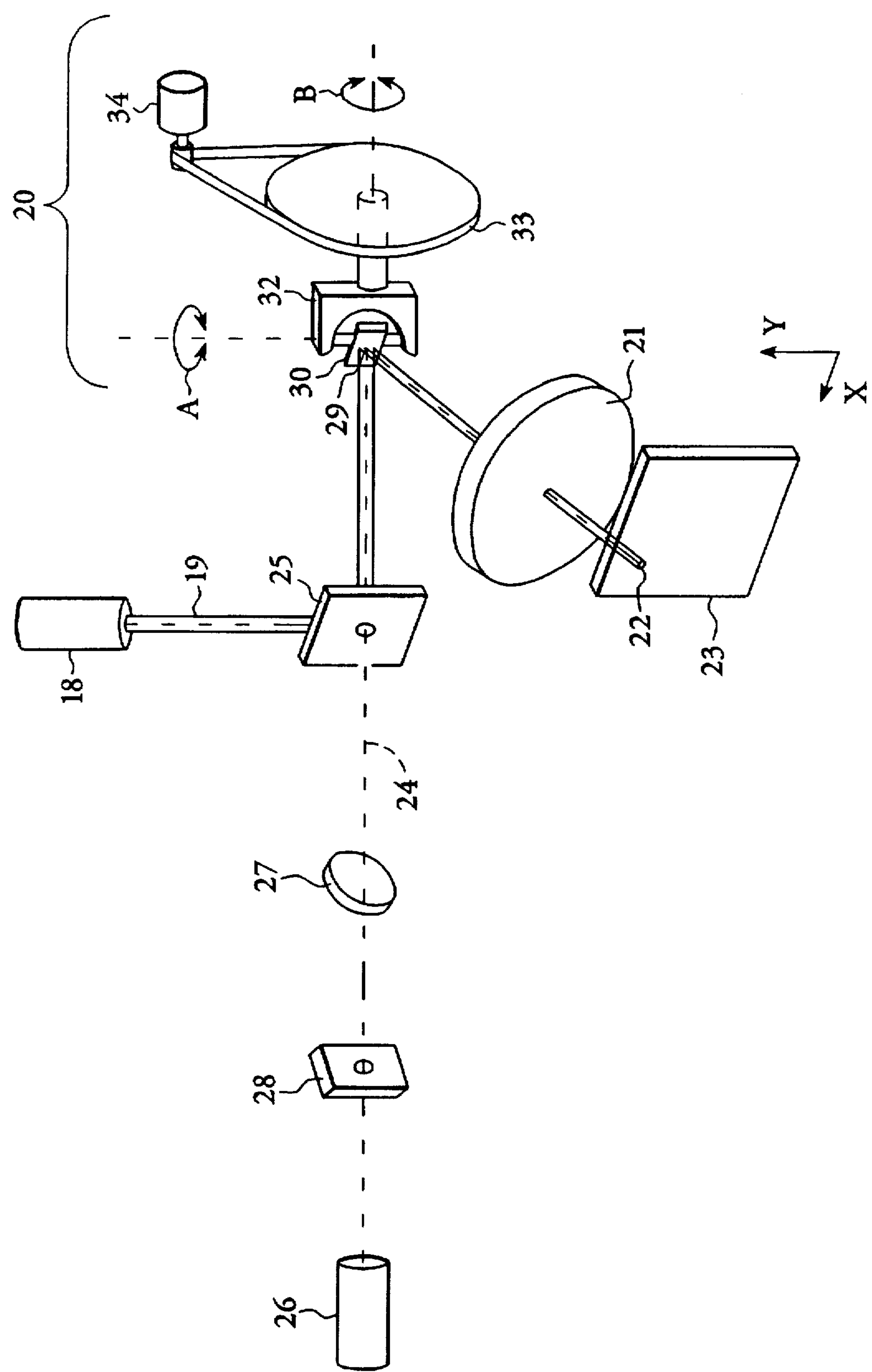
FIG. 2 is a perspective view of optical components of the present invention.

FIG. 2 shows a laser 18 producing an incident beam 19 of light. It is preferred that the laser produce a collimated beam of coherent light. However, it is possible to use a non-coherent light source optically coupled to collimating optics to create an incident light beam, e.g., a light emitting diode.

The beam 19 is reflected on a two dimensional scanning device 20 and directed through an achromatic objective 21, which also serves as a condenser. One advantage of having collimated light entering the objective is that it renders the system less sensitive to changing objectives. The objective 21 directs the beam 19 to illuminate a spot 22 on a sample 23, thereby stimulating a small region of the sample to emit fluorescent light. The fluorescent light is collected by the objective 21 and directed, as a retro-beam 24, back along the identical path of the incident beam 19, but in an opposite direction. A dichroic filter 25 separates fluorescent light from the incident beam and images the retro-beam 24 onto a photodetector 26. The dichroic filter 25 could be employed so that it transmits laser light and reflects fluorescent light. Alternatively, the laser light could be reflected and the fluorescent light transmitted so that the fluorescent light impinges on the photodetector 26, which is the preferred embodiment shown in FIG. 2. It is to be understood that any type of beamsplitter may be employed, so long as it is capable of separating the incident beam from the fluorescent light. For example, a polarization sensitive beamsplitter may be used to achieve the separation. This embodiment could include a ¼ waveplate positioned between the beamsplitter and the objective. This would cause the incident beam exiting the ¼ waveplate to be circularly polarized. Also, additional focusing optics 27 and a back aperture 28 may be present to further shape the retro-beam 24 as desired. The sample 23 is illuminated point by point by scanning the spot 22 in a raster scan fashion over the entire surface of the sample 23, to obtain a full-field image of it.

Figure 1:
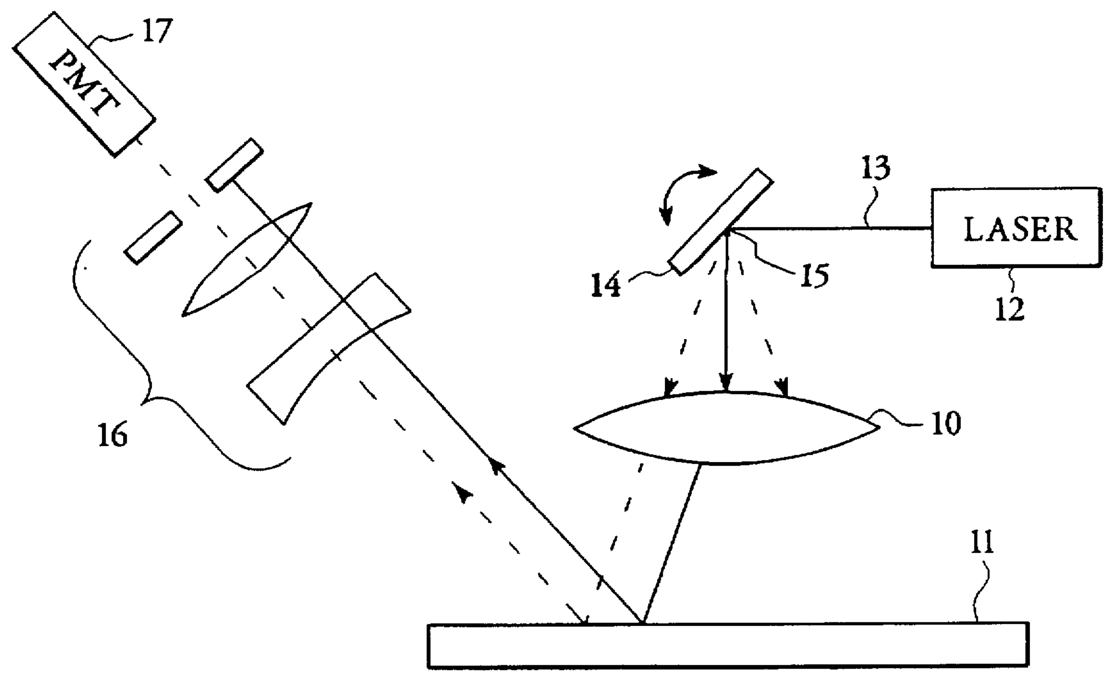
FIG. 1 is a simplified side view of a laser scanning microscope of the prior art.
Figure 3:
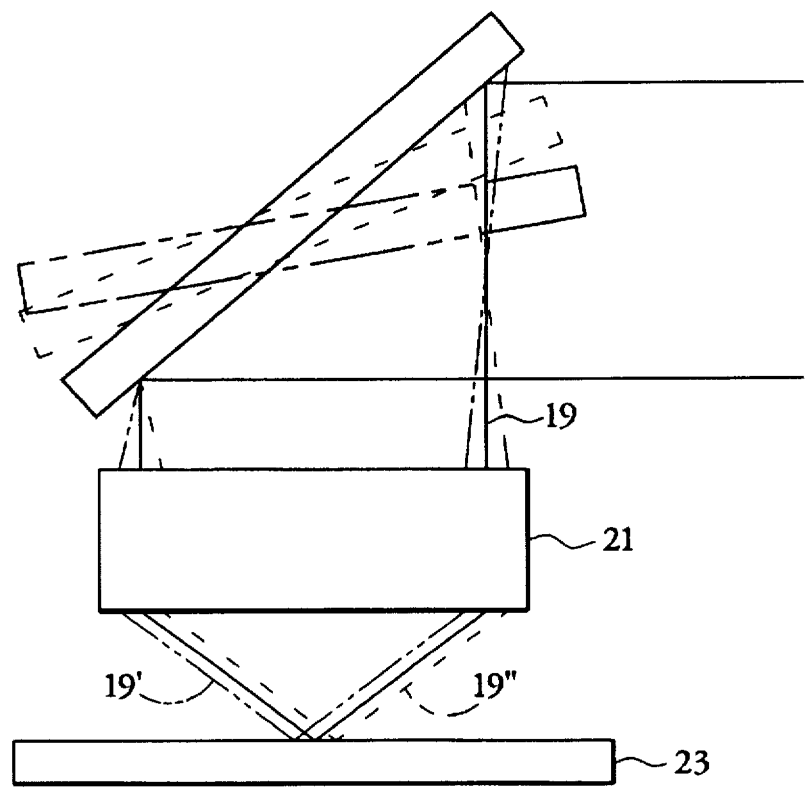
FIG. 3 is a detailed view of a scanning beam passing through the objective shown in FIG. 2.

Referring to FIG. 3, the objective 21 affords coaxial illumination and collection. With respect to the incident beam 19, the objective 21 is afocal in the image plane. It is preferred that the objective is telecentric. The telecentricity of the objective results in the sample 23's surface always lying at a right angle with respect to the incident beam 19, exiting the objective 21. With respect to the incident beam 19, the objective plane is proximate to the sample 23. The beam 19 is shown entering the objective 21 at three different positions, with the incident beam 19 having a different angle of incidence at each position. Regardless of the incident beam 19's angle of incidence on the objective 21, the incident beam 19 exiting the objective 21 is orthogonal to the sample 23's surface. One advantage of having this telecentric objective is that it renders the system magnification relatively insensitive to errors in focus position. In addition, the achromaticity of the objective 21 allows it to operate over a broad band of wavelengths of light, e.g., the primary wavelength plus approximately 200 nm, or greater, while maintaining axial and lateral aberrations below the effective resolution of the system. This allows the objective 21 to operate with lasers of various wavelengths and to collect light from a wide variety of fluorochromes.

The specifications of two implementations of the objective are as follows:

| | | |
|---|---|---|
| Primary Wavelength (nm) | 488 | 488 |
| Focal Length (mm) | 30 | 76 |
| Scan Angle (degrees) | +/−3 | 20 |
| Scan Length (mm) | 3 | 52 |
| Telecentricity (degrees) | <1 | <1 |
| F/Number (@ 488 nm) | f/1.5 | f/4.8 |
| Resolution (microns) | ≈1.5 | ≈5 measured at ($1/e^2$) |
| Working Distance (mm) | ≈3 | 20 |
| Collection Wavelength (nm) | 488–650 | 488–650 |
| Collection F/Number | f/1.5 | –f/2 to f/2.5 |

It is important to note that the specifications listed above are merely exemplary of the lenses used in the present invention. The parameters may be varied as needed to adapt a system to a particular operation.

Referring again to FIG. 2, an important feature of the objective 21 is that it defines an external pupil 29 of the system, which is positioned at the scan center. Any scanning mechanism that provides a two dimensional scan may be used, e.g., a rotating polygonal mirror, rotating holographic scanner, or oscillating prisms. Also, an acousto-optic deflector or a penta-prism scanning deflector may be employed. The preferred embodiment, however, is to employ a scanning system having one beam reflecting element in the path of the incident beam which is pivotable about two perpendicular axes. The reflecting element is a planar mirror 30, but this is not essential as refractive or diffractive deflecting elements may also be used. The mirror is supported on spindles 31 by a forked bracket 32 and, therefore, pivotable about axis A. The mirror 30 may be moved by any means known in the art, but is typically a galvanometer mirror. The bracket 32 is attached at one end to wheel 33 that is driven by a stepper motor 34. The motor 34 drives the wheel 33 to pivot the mirror 30 about axis B.

Figure 4:
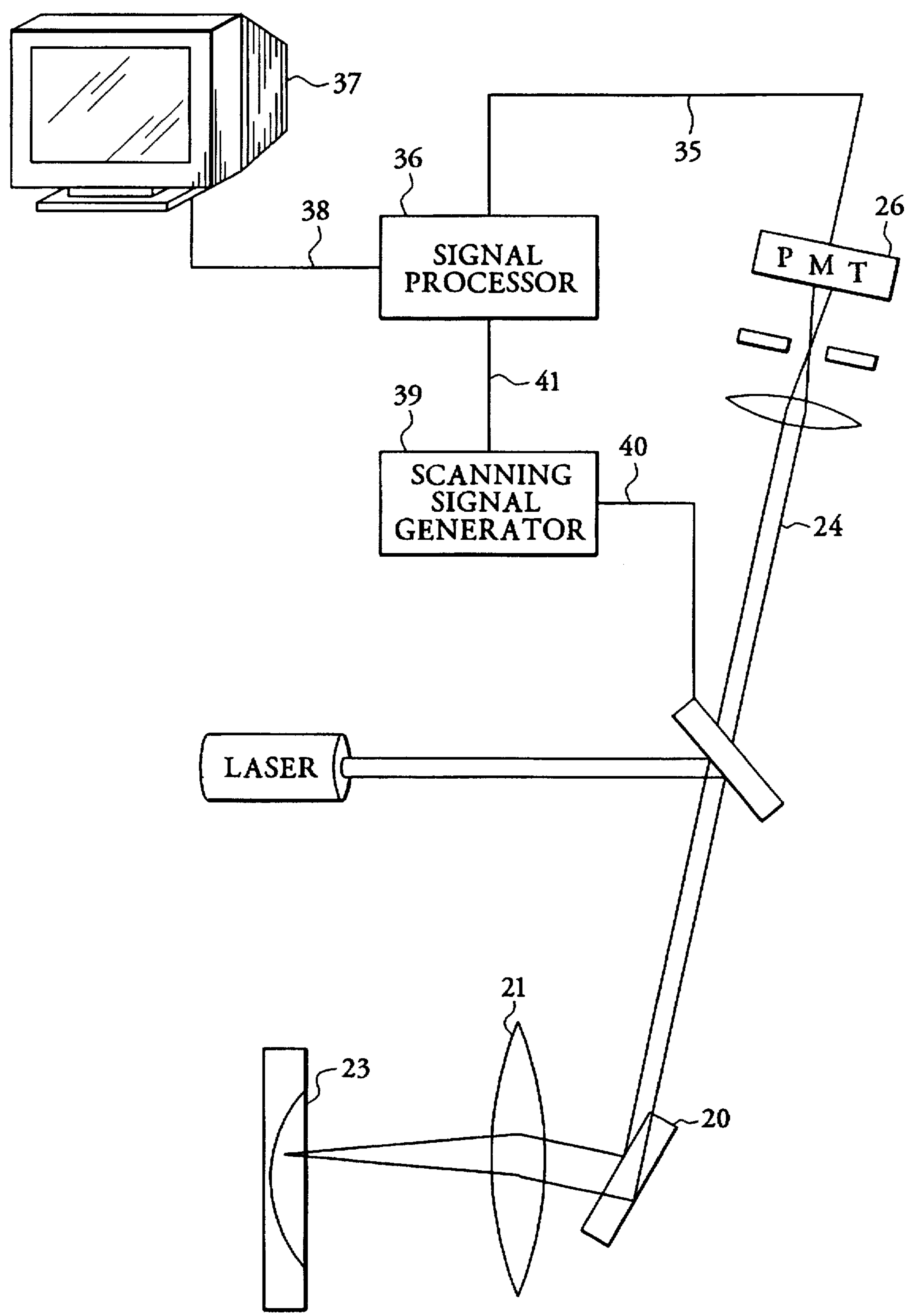
FIG. 4 is a simplified side view of the optical components shown on FIG. 2 including a video display system to reproduce an image of the sample in accordance with the present invention.

Referring to FIG. 4, the retro-beam 24 is shown emanating from a plurality of points on the sample 23's surface. The retro-beam 24 is imaged on a light detector 26. Although any light detector may be used, it is preferred to use a photomultiplier tube. The signal from the photomultiplier tube passes through electrical connections 35 to a signal processor 36 of a video display system including a video display screen 37. The signal from the photomultiplier tube 26 modulates the intensity of the image signal transmitted from the processor 36 through the output line 38 to the display screen 37. A scanning signal generator 39 supplies electrical signals to the scanning apparatus 20 through electrical connections 40. The scanning apparatus moves in response to the generator 39's signals. The signal from the photomultiplier tube is digitized and stored in memory and can be simultaneously scanned onto a display.

An obvious extension of the invention is in the area of reflection imaging. That is, the reflected laser beam could be collected at the detector instead of the fluorescent beam. Both the reflected beam and the fluorescent beam could be read at the detectors if a second dichroic beamsplitter was positioned after the primary dichroic beamsplitter. Or in a like manner, multiple fluorescent labels could be detected by using multiple secondary beamsplitters and detectors.

I claim:

1. An optical scanning system for microscopy of a sample comprising, a photodetector, a beam source for emitting an incident beam, a telecentric objective disposed proximate to said sample, defining an optical axis, a high numerical aperture and a single pupil, with said single pupil located external to said objective in said optical axis, said objective being positioned to receive said incident beam and directing said incident beam onto said sample, producing an illuminated spot thereon with said objective collecting light emitted from said spot and forming a retro-beam, said objective being afocal at said external pupil, means, positioned at said pupil, for scanning said spot, on said sample surface, with substantially all light associated with said retro-beam impinging upon said scanning means, and means positioned in said optical axis between said beam source and said objective for separating said incident beam from said retro-beam, wherein said objective directs said retro-beam onto said separating means, with said separating means directing said retro-beam onto said photodetector.

2. The optical scanning system of claim 1 wherein said objective is achromatic.

3. The optical scanning system of claim 1 wherein said scanning means raster scans said spot over the entire surface of said sample.

4. The optical scanning system of claim 1 further including means, connected to said detector, for displaying a visual image of said sample.

5. The optical scanning system of claim 1 wherein said objective has first and second ends, with said first end facing said scanning means and spaced-apart therefrom a first distance, with said second end opposing said first end and positioned proximate to said sample, defining a working distance therebetween, with said working distance being substantially less than said first distance.

6. The optical scanning system of claim 1 wherein said separating means is a dichroic filter.

7. The optical scanning system of claim 1 wherein said separating means is a fresnel reflector.

8. The optical scanning system of claim 1 wherein said separating means is a 50% beamsplitter.

9. The optical scanning system of claim 1 wherein said separating means is a polarization sensitive beamsplitter.

10. The optical scanning system of claim 1 further including means, positioned between said beam source and said separating means, for changing the diameter of said incident beam.

11. The optical scanning system of claim 1 wherein said beam source includes a non-coherent source of light optically coupled to collimating optics.

12. The optical scanning system of claim 1 wherein said beam source comprises a light emitting diode optically coupled to collimating optics.

13. The optical scanning system of claim 1 wherein said separating means is a mirror having a diameter greater than a diameter of said incident beam and smaller than a diameter of said retro-beam, with the diameter of said retro-beam being substantially larger than the diameter of said incident beam.

14. The optical scanning system of claim 1 wherein said retro-beam comprises of all light reflected rearwardly and collected by said objective.

15. The optical scanning system of claim 1 wherein said scanning means includes an acousto-optic deflector.

16. The optical scanning system of claim 1 wherein said scanning means includes a refractive scanning deflector.

17. The optical scanning system of claim 1 wherein said scanning means includes a diffractive scanning deflector.

18. The optical scanning system of claim 1 wherein said scanning means includes a rotating penta-prism scanning deflector.

19. The optical scanning system of claim 1 wherein said scanning means includes a reflective surface.

20. The optical scanning system of claim 19 wherein said reflective surface is a planar mirror.

21. The optical scanning system of claim 19 wherein said reflective surface is a concave mirror.

22. The optical scanning system of claim 19 wherein said reflective surface is a convex mirror.

23. The optical scanning system of claim 19 wherein said reflective surface is a polygon mirror.

24. An optical scanning system for microscopy of a sample, said system comprising, a source to produce an incident beam, a photodetector, a telecentric objective lens means for directing said incident beam onto said sample forming an illuminated spot thereon, and collecting light emitted from said spot, forming a retro-beam, said objective lens means defining a single pupil and a working distance, with said pupil being located external to said objective lens means, said objective lens means being afocal at said pupil, said working distance being measured between said sample and said objective lens means, with said objective lens means adapted to provide different numerical apertures, with said numerical apertures being inversely proportional to said working distance so as to maintain said objective lens means proximate to said sample, means, in said optical axis at said pupil, for scanning said spot across said sample, and means, positioned in said optical axis between said source and said objective lens means, for separating said incident beam from said retro-beam, wherein said objective lens means directs said retro-beam toward said photodetector.

25. The optical scanning system of claim 24 wherein said separating means is a beamsplitter.

26. The optical scanning system of claim 24 wherein said separating means is a fresnel reflector.

27. The optical scanning system of claim 24 wherein said separating means is a mirror having a diameter greater than a diameter of said incident beam and smaller than a diameter of said retro-beam, with said diameter of said retro-beam being substantially larger than said diameter of said incident beam.

28. The optical scanning system of claim 24 wherein said scanning means includes is a planar mirror.

29. The optical scanning system of claim 24 wherein said scanning means includes a concave mirror.

30. The optical scanning system of claim 24 wherein said scanning means includes a convex mirror.

31. The optical scanning system of claim 24 wherein said scanning means includes a refractive scanning deflector.

32. The optical scanning system of claim 24 wherein said scanning means includes a diffractive scanning deflector.

33. The optical scanning system of claim 24 wherein said scanning means is a polygon mirror.

34. The optical scanning system of claim 24 wherein said incident beam is collimated and said retro-beam is fluorescent light.

35. The optical scanning system of claim 24 wherein said incident beam is collimated and said emitted light is reflected light.

36. The optical scanning system of claim 24 wherein said incident beam is polarized and further including a ¼ waveplate positioned between said separating means and said objective lens means, whereby said incident beam, exiting said ¼ waveplate, is circularly polarized and said retro-beam exiting said ¼ waveplate is linearly polarized.

37. An optical scanning system for microscopy of a sample, said system comprising, a beam source for emitting a collimated beam of coherent light, a photodetector, a telecentric objective defining an optical axis and a single pupil, with said pupil located external to said objective, said objective positioned to receive said collimated beam therethrough to illuminate a spot on said sample and collect light emitted from said spot, and forming a retro-beam, said objective being achromatic and afocal at said pupil, means, in said optical axis, for scanning said spot, on said sample, said scanning means including a reflective element positioned at said pupil of said objective, with said telecentric objective adapted to form said retro-beam with a cross-sectional area of sufficient size relative to said reflective element to ensure substantially all light associated with said retro-beam impinges upon said reflective element, and means positioned in said optical axis between said beam source and said objective for separating said incident beam from said retro-beam, wherein said objective directs said retro-beam toward said photo-detector, with said photo-detector producing signals representing said substantially all light emitted from said spot.

38. The optical scanning system of claim 37 wherein said objective has first and second ends, with said first end facing said scanning means, and spaced apart therefrom a first distance, with said second end opposing said first end and positioned proximate to said sample, defining a working distance therebetween, said working distance being substantially less than said first distance.

39. The optical scanning system of claim 38 wherein said working distance is in the range between 3 and 3.5 mm inclusive.

* * * * *